United States Patent
Brown et al.

(10) Patent No.: US 8,099,595 B2
(45) Date of Patent: *Jan. 17, 2012

(54) SYNCHRONIZING CERTIFICATES BETWEEN A DEVICE AND SERVER

(75) Inventors: Michael Kenneth Brown, Fergus (CA); Herbert Anthony Little, Waterloo (CA); Michael Stephen Brown, Kitchener (CA); Neil Patrick Adams, Kitchener (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/091,523

(22) Filed: Apr. 21, 2011

(65) Prior Publication Data

US 2011/0196989 A1  Aug. 11, 2011

Related U.S. Application Data

(63) Continuation of application No. 11/259,372, filed on Oct. 27, 2005, now Pat. No. 7,953,971.

(51) Int. Cl.
  *H04L 29/06* (2006.01)
(52) U.S. Cl. ....................................................... 713/156
(58) Field of Classification Search .................. 713/156; 726/2; 380/247, 270, 277
  See application file for complete search history.

(56) References Cited

U.S. PATENT DOCUMENTS

| | | | |
|---|---|---|---|
| 4,028,500 A | 6/1977 | McClure et al. |
| 5,410,602 A | 4/1995 | Finkelstein et al. |
| 5,457,748 A | 10/1995 | Bergum et al. |
| 5,666,530 A | 9/1997 | Clark et al. |
| 5,812,671 A | 9/1998 | Ross |
| 6,061,448 A | 5/2000 | Smith et al. |
| 6,073,237 A | 6/2000 | Ellison |
| 6,081,601 A | 6/2000 | Raivisto |
| 6,084,969 A | 7/2000 | Wright et al. |
| 6,085,323 A | 7/2000 | Shimizu et al. |
| 6,119,228 A | 9/2000 | Angelo et al. |
| 6,229,894 B1 | 5/2001 | Van Oorschot et al. |

(Continued)

FOREIGN PATENT DOCUMENTS

EP  0500245  8/1992

(Continued)

OTHER PUBLICATIONS

Stallings, W.: "SIMIME: E-Mail Gets Secure". Byte, McGraw-Hili Inc., St. Peterborough, US, vol. 23, No. 7, Jul. 1998, pp. 41-42, XP000774260.

(Continued)

*Primary Examiner* — Eleni Shiferaw
*Assistant Examiner* — Ali Abyaneh
(74) *Attorney, Agent, or Firm* — Dimock Stratton LLP; Etienne deVilliers

(57) ABSTRACT

Systems and methods for processing messages within a wireless communications system are disclosed. A server within the wireless communications system maintains a list of certificates contained in devices that use the server. The server synchronizes or updates the list of certificates based on information contained in message to and from the device. By providing a server with certificates associated with devices that use the server, and providing a system and method for synchronizing the certificates between the device and server, the server can implement powerful features that will improve the efficiency, speed and user satisfaction of the devices. The exemplary embodiments also enable advantageous bandwidth savings by preventing transmission of certificates unnecessarily.

8 Claims, 6 Drawing Sheets

U.S. PATENT DOCUMENTS

| | | | |
|---|---|---|---|
| 6,266,420 | B1 | 7/2001 | Langford et al. |
| 6,289,105 | B1 | 9/2001 | Murota |
| 6,661,927 | B1 | 12/2003 | Suarez et al. |
| 6,697,942 | B1* | 2/2004 | L'Heureux et al. ........... 713/152 |
| 6,779,115 | B1 | 8/2004 | Naim |
| 6,829,357 | B1 | 12/2004 | Alrabady et al. |
| 6,904,521 | B1 | 6/2005 | Jivsov |
| 6,918,038 | B1 | 7/2005 | Smith et al. |
| 6,925,568 | B1 | 8/2005 | Heinonen |
| 6,983,367 | B2 | 1/2006 | Go et al. |
| 6,993,137 | B2 | 1/2006 | Fransdonk |
| 7,020,708 | B2 | 3/2006 | Nelson et al. |
| 7,113,927 | B1 | 9/2006 | Tanaka et al. |
| 7,127,604 | B2 | 10/2006 | Lide et al. |
| 7,171,552 | B1 | 1/2007 | Bell |
| 7,228,418 | B1 | 6/2007 | Girault |
| 7,254,712 | B2* | 8/2007 | Godfrey et al. ............... 713/176 |
| 7,529,374 | B2 | 5/2009 | Huttunen |
| 2001/0046307 | A1 | 11/2001 | Wong |
| 2002/0007453 | A1 | 1/2002 | Nemovicher |
| 2002/0032861 | A1 | 3/2002 | Azuma |
| 2002/0035687 | A1 | 3/2002 | Skantze |
| 2002/0059383 | A1 | 5/2002 | Katsuda |
| 2003/0172122 | A1 | 9/2003 | Little et al. |
| 2003/0198350 | A1 | 10/2003 | Foster et al. |
| 2004/0083364 | A1 | 4/2004 | Andreaux et al. |
| 2005/0102503 | A1* | 5/2005 | Imai ............................ 713/156 |
| 2005/0114671 | A1 | 5/2005 | Little et al. |
| 2005/0163320 | A1 | 7/2005 | Brown et al. |
| 2005/0188219 | A1 | 8/2005 | Annic et al. |
| 2005/0203855 | A1* | 9/2005 | Malcolm ........................ 705/64 |
| 2005/0210289 | A1 | 9/2005 | Brown |
| 2005/0246763 | A1 | 11/2005 | Corcoran et al. |
| 2006/0036865 | A1 | 2/2006 | Brown et al. |
| 2007/0118874 | A1 | 5/2007 | Adams et al. |
| 2007/0123307 | A1 | 5/2007 | Adams et al. |
| 2007/0165844 | A1 | 7/2007 | Little et al. |

FOREIGN PATENT DOCUMENTS

| | | |
|---|---|---|
| EP | 0841770 A | 5/1998 |
| EP | 1096725 A2 | 5/2001 |
| EP | 1096727 A2 | 5/2001 |
| EP | 1580953 | 9/2005 |
| EP | 1806683 | 7/2007 |
| JP | 8-251221 A | 9/1996 |
| JP | 10-22992 A | 1/1998 |
| KR | 1020030059303 | 7/2003 |
| WO | 96/36934 A1 | 11/1996 |
| WO | 97/41661 A | 11/1997 |
| WO | 98/34374 A | 8/1998 |
| WO | 99/05814 | 2/1999 |
| WO | 99/06900 | 2/1999 |
| WO | 99/27678 A2 | 6/1999 |
| WO | 00/31931 A1 | 6/2000 |
| WO | 00/69114 A | 11/2000 |
| WO | 00/72506 A1 | 11/2000 |
| WO | 01/24434 A | 4/2001 |
| WO | 01/78491 A2 | 10/2001 |
| WO | 03/005636 | 1/2003 |

OTHER PUBLICATIONS

Crocker S. et al.: MIME Object Security Services; rfc1848.textM. IETF Standard, Internet Engineering Task Force, IETF, CHI Oct. 1995, XP015007633.

European Supplementary Search Report. Application No. 05826460. 7, Feb. 14, 2008.

European Examination Report. Application No. 05826460.7, Apr. 4, 2008.

PCT International Search Report and Written Opinion of the International Searching Authority, International App. No. PCT/CA2005/001956, Jul. 29, 2006.

Blom et al. "Conversational IP Multimedia Security", 4th International Workshop on Mobile and Wireless Communications Network, Sep. 9-11, 2002, pp. 147-151.

Fumy et at. Principles of Key Management, IEEE Journal on Selected Areas in Communications, VDI, 11, No. 5, Jun. 1999, pp. 785-793.

Eskicioglu et at. "A Key Transport Protocol Based on Secret Sharing Applications to Information Security", IEEE Transactions on Consumer Electronics, vol. 46, No. 4, Nov. 2002, pp. 816-824.

Kotzanikoloau et al. "Hybrid Key Establishment for Multiphase Self-organized Sensor Networks", 6 IEEE International Symposium on a World of Wireless Mobile and Multimedia Networks, Jun. 13-16, 2005, pp. 581-587.

Korean Examination Report (English translation). Application No. 10-2007-701 1342. Dated: Jul. 15, 2008.

Research in Motion Limited, Blackberry Security White Paper Release 4.0. 2005 Internet Address: http://blackberry.comlknowledgecenterpublicIlivelink.exe?func=II&objld=S2SO44&objAction=browse&sort=name.

Policht, Martin, Sal Server 2005 Security—Part 3 Encryption, Database Journal Internet Address: http://www.databasejournal.com/features/mssql/article.php/34S3931.

Encrypt Pre-shared Keys in Cisco 10s Router Configuration Example, Document 1 D 46420 CISCO Systems, Internet Address: htto:/lwww.cisco.com/en/US/tech/tk5S3/tk3721t echnologies~configuration~example09186a008f021336.shtml.

European Examination Report dated Apr. 20, 2009, European Patent Application No. 05826460.7.

Kiely, Don, Sal Server 2005 Secures Your Data Like Never Before, Sep. 29, 2005. Internet Address: http://www.devx.comlcodemaglArticle/29351?trk=DXESS DB.

Hoffman: "Enhanced Services for SIMIME," Database IETF RFC Online IETF; RFC 2634, 0611999, pp. 1-58 (Chapter 3, pp. 24-32), XP002220386.

Schumacher: "AutoPGP FAQ, Version 1 ," Internet Newsgroup, 'Online! (Apr. 19, 1994), XP002230742.

Levien: "Protecting Internet E-Mail From Prying Eyes," Data Communications, McGraw Hill, New York, US, vol. 25, No. 6 (May 1,1996), pp. 117-118, 120, 122, XP 000587586.

Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.

Gong et al.: "Multicast Security and its Extension to a Mobile Environment," SRI International, Computer Science Laboratory, J.C. Baltzer AG, Science Publishers, Wireless Networks 1 (1995) pp. 281-295.

Lai, M.K.E., et al.: "A Mobile Subscriber Proxy Preserving Writer-to-Reader Message Security", Military Communications Conference, 1996, Milcom '96, Conference Proceedings, IEEE McLean, VA, USA Oct. 21-24, 1996, New York, NY, USA, IEEE, US, Oct. 21, 1996, pp. 461-467, XP010203896.

Cole R., et al: "An Architecture for a Mobile OSI Mail Access System", IEEE Journal on Selected Areas in Communications, IEEE Inc., New York, US, vol. 7, No. 2, Feb. 1989, pp. 249-256, XP000904914.

Harris A.: "Content Privacy and Content Security Working Together", Internet Article. Content Technologies White Paper, 'Online! Sep. 1999, XP002223158, pp. 8-9.

Torvinen V.: "Wireless PKI: Fundamentals", Internet Article. Radicchio White Paper, 'Online! 2000, XP002223159, pp. 12-13.

Mambo M., et al: "Proxy Signatures: Delegation of the Power to Sign Messages" IEICE Transactions on Fundamentals of Electronics, Communications and Computer Sciences, IEICE Tokyo, JP, vol. E79-A, No. 9, Sep. 1, 1996, pp. 1338-1353, XP000679624.

Brown M., et al.: "PGP in Constrained Wireless Devices", Proceedings of the 9th Usenix Security Symposium, Denver, CO, Aug. 14-17, 2000, XP 002210575, No. 12, Oct. 1999, pp. 1049-1060, XP000852351.

Sybramanyam V., et at.: "Security in mobile systems", Reliable Distributed Systems, 1998 Proceedings, 17th IEEE Symposium on W. Lafayette, IN USA Oct. 20-23, 1998, Los Alamitos CAI USA, IEEE Comput. Soc., US, Oct. 20, 1998, pp. 407-412, XP010319125.

International Search Report of Application No. PCT/CA02/00890, date of mailing Dec. 23, 2002—12 pgs.

* cited by examiner

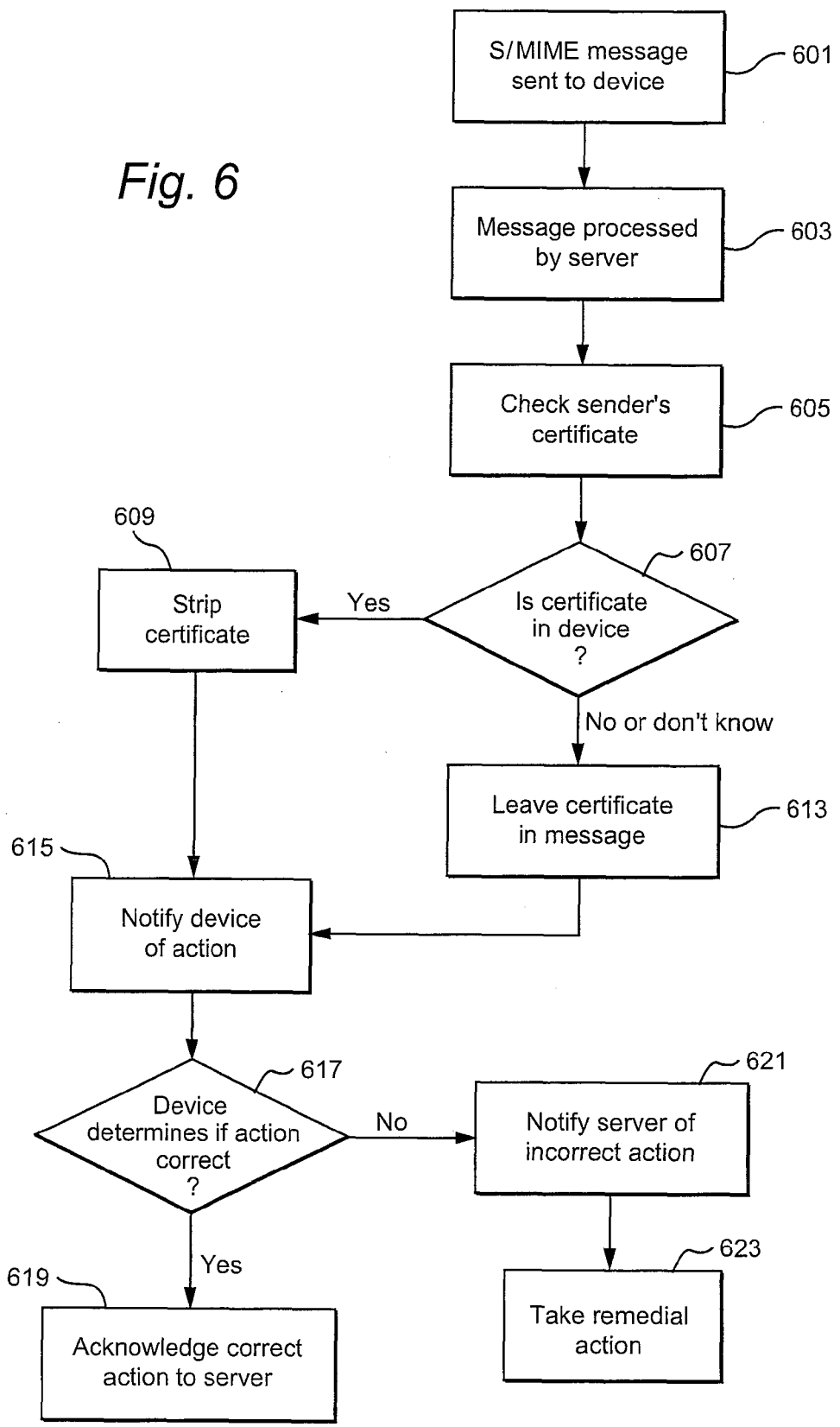

SYNCHRONIZING CERTIFICATES BETWEEN A DEVICE AND SERVER

BACKGROUND OF THE INVENTION

1. Cross Reference to Related Applications

This application is related to co-pending, commonly assigned, U.S. patent application Ser. No. 10/914,634 entitled "Server Verification of Secure Electronic Messages," filed Aug. 10, 2004, the disclosure of which is incorporated herein by reference in its entirety.

2. Field of the Invention

The present invention relates generally to an electronic messaging system that is capable of processing encoded messages and information. In particular, the disclosure is directed to a system in which an electronic message server performs some functions typically performed by a mobile wireless communications device having secure electronic messaging capability. In order to perform such functions, the server is capable of storing and maintaining, for example, certificates, associated with the mobile wireless communications devices that use the server. Accordingly, the present disclosure is directed to systems and methods for ensuring that the information, such as certificates, associated with the devices that use the server and which are stored on the server is kept up to date.

3. Related Art

Exchanging cryptographically encoded secure electronic messages and data, such as, for example, e-mail messages, is well known. In many known electronic message exchange schemes, signatures, encryption or both are commonly used to ensure the integrity and confidentiality of information being exchanged between a sender and a recipient of the electronic messages. In an e-mail system, for example, the sender of an e-mail message may either sign the message, encrypt the message or both sign and encrypt the message. These actions may be performed using well-known standards, such as, for example, Secure Multipurpose Internet Mail Extensions (S/MIME), Pretty Good Privacy™ (PGP™), OpenPGP, and numerous other secure e-mail standards.

In general, secure e-mail messages are relatively large. For example, S/MIME can increase the size of an e-mail message by a factor of ten or more in some situations. This size augmentation, caused for example by appending certificates to the message, presents difficulties, especially in devices that have a limit on the size of a message that can be processed, such as, for example, a mobile wireless communications device. Such a device may also experience difficulty handling a message wherein only a portion of the message has been transferred to the device because of the above-mentioned size limitations.

To the extent processor intensive actions, such as, for example, verification of signatures, can be performed by a more powerful and faster device, such as, for example, a server, advantages with respect to device efficiency, speed and improved user satisfaction can be realized by a reduction of computational overhead of the device. However, in order to take advantage of the improved processor capability and speed of the server, it is necessary for the server to have the proper information available to perform the functions otherwise performed by the mobile device. For example, if the server maintains a list of certificates associated with devices using the server, the server will have the ability to verify signatures for the user. This is an especially powerful tool if the message is long. In addition, the server can effectively compress the certificate information that is sent in the S/MIME message. For example, if the server knows that a device already has a particular certificate on it, then when an S/MIME message to the device includes that certificate, the server can safely remove this certificate. This saves a great deal of bandwidth for each certificate that is removed. The bandwidth savings realized by removing redundant certificate information is especially useful because the certificate information limits the amount of bandwidth available for the message. However, to realize the efficiencies attendant with having device certificate information resident at the server, it is important to keep this certificate information up to date. To that end, what is needed is a system and method for synchronizing information, such as, for example, certificates, between the server and its associated devices.

BRIEF SUMMARY OF THE INVENTION

In view of the foregoing, we have now identified efficient and easy to implement systems and methods for synchronizing information, such as, for example, certificates between a server and the devices that use the server. By providing a server with certificates contained in devices that use the server, and providing a system and method for synchronizing the certificates between the devices and server, the server can implement powerful features that will improve the efficiency, speed and user satisfaction of the devices.

According to an exemplary embodiment of the present disclosure, a server within the wireless communications system has the ability to keep and maintain a list of certificates that are contained in devices that use the server. The server may keep this list up to date, i.e., synchronized, by building a list for each device, and maintaining the currency of the lists based on activity of the device, such as, for example, messages sent by the device that are processed by the server. For example, whenever the device sends an S/MIME message, the device may append a list of certificate thumbprints to the message together with an indication of what action is to be performed by the server with respect to the appended certificates so that the server can maintain the currency of the certificate lists. Initially, the thumbprints may be used to build the list of certificates residing on the server that are contained in the devices using the server. The actions that are to be performed may include, for example, adding the certificates to the list and/or removing the certificates from the list. The device may send the certificate thumbprints one at a time or in bulk in a single S/MIME message. When the server receives the message with the appended certificate information for processing, the server is able to strip out the certificate information field from the S/MIME message and then update the database. In this manner, the server database that includes the certificate information for devices using that server can be kept up to date or synchronized.

According to another exemplary embodiment of the disclosure, the server is operable to learn what certificates are on the devices using empirical techniques. For example, when an S/MIME message is sent to the device, the server may check the sender's certificate to determine if it is on the device. If the server believes that the certificate is on the device, it will automatically strip the certificate from the sender's message and put it in the server database list of certificates for the device. If the server does not know or otherwise does not believe that the certificate is on the receiving device, the server leaves the certificate data appended to the message. Upon receipt of the message, the device performs a check to determine what was done by the server with respect to the certificate information in the original message. If the server acted correctly, for example, stripped the certificate when it was on the device or left the certificate information with the message when it was not on the device, the device sends back an acknowledgement indicating to the server that the server took the correct action. If the server acted incorrectly, for example, by stripping the certificate when it was not on the device or included the certificate when it was on the device, the device provides an indication of this error to the server as well. In this interactive and iterative manner, the server ultimately learns the state of the device and its certificates.

The foregoing exemplary embodiments provide a solution to the problem of maintaining an up to date list of certificates that are in devices that use a particular server, thereby enabling the server to perform, for example, computationally intensive actions and thereby distributing the processing overhead of the mobile wireless communications devices to the server, thereby enabling the sharing of system resources to assist the device, for example, in verifying secured electronic messages. Moreover, the exemplary embodiments also enable advantageous bandwidth savings by preventing transmission of certificates unnecessarily.

The advantages attendant with the various embodiments of the invention described above are provided by the method and system of synchronizing certificates between a server and device disclosed and described herein with reference to the drawings.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which:

FIG. 6 is an illustrative flow diagram of an alternative exemplary operational scenario according to another exemplary embodiment of the present invention.

DETAILED DESCRIPTION OF EXEMPLARY EMBODIMENTS

Figure 1:
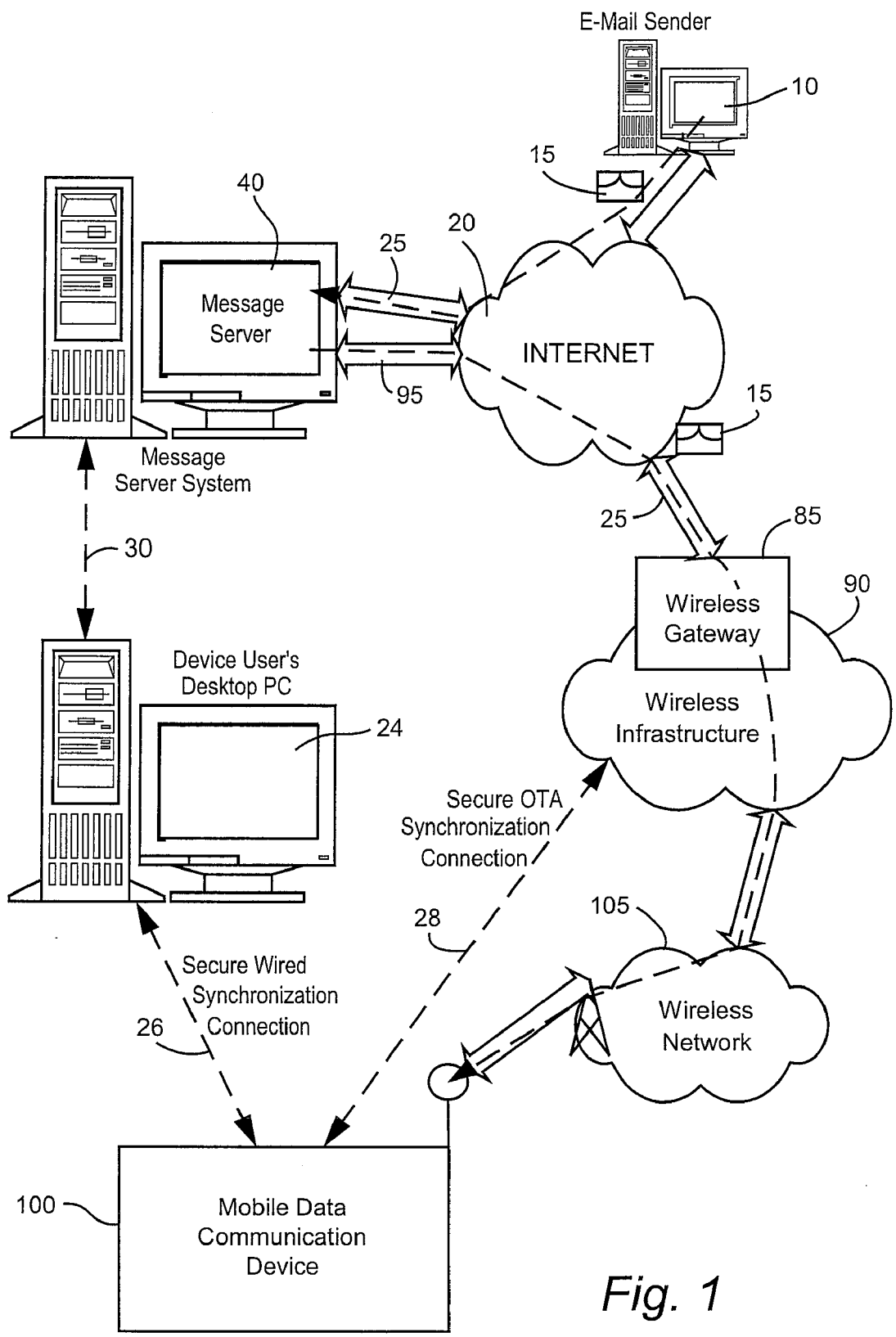
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
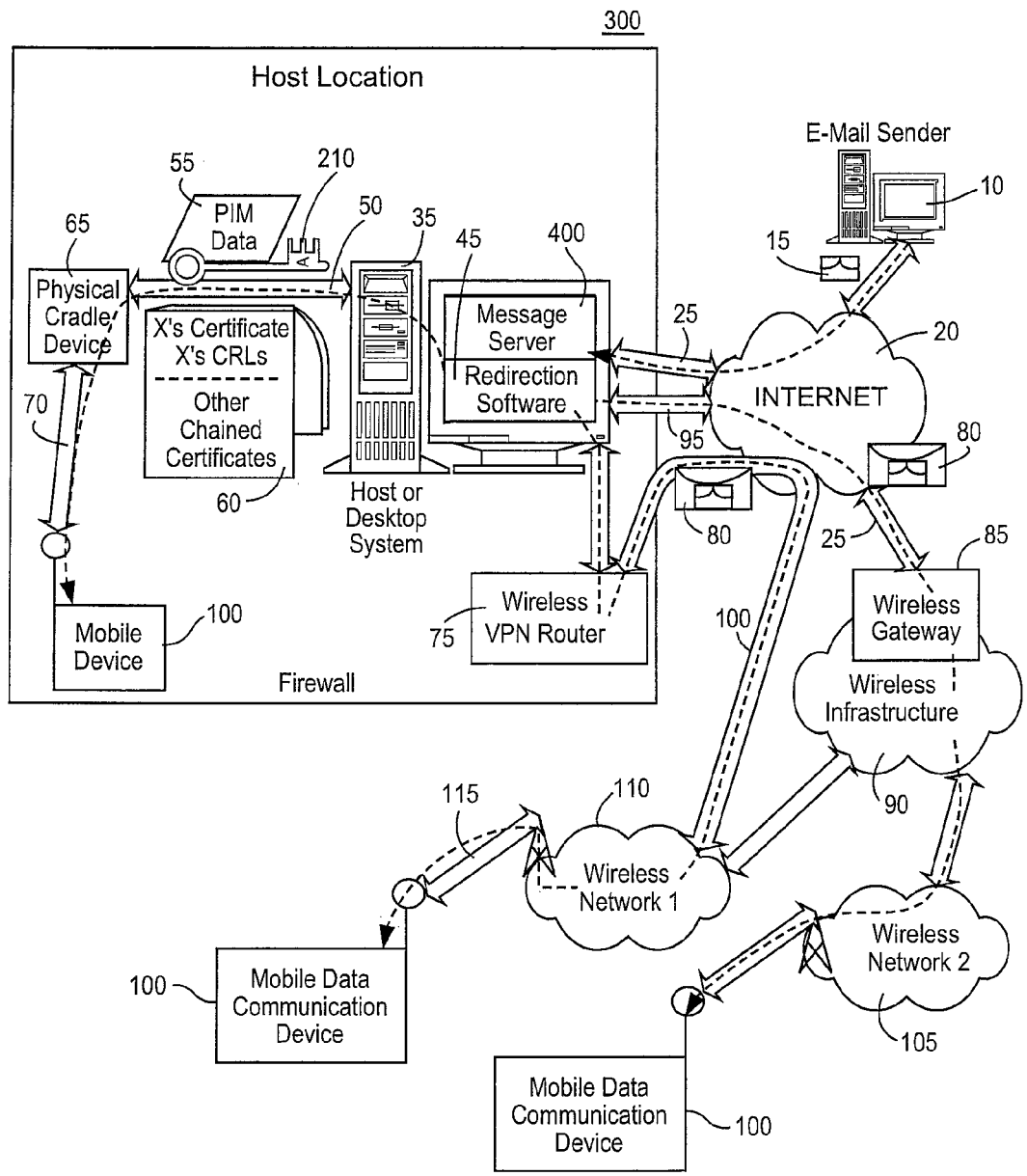
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail.

The Cert and CRLs are normally exchanged over such a link because they represent a large amount of the data that is required by the device for S/MIME, PGP and other public key security methods.

Figure 3:
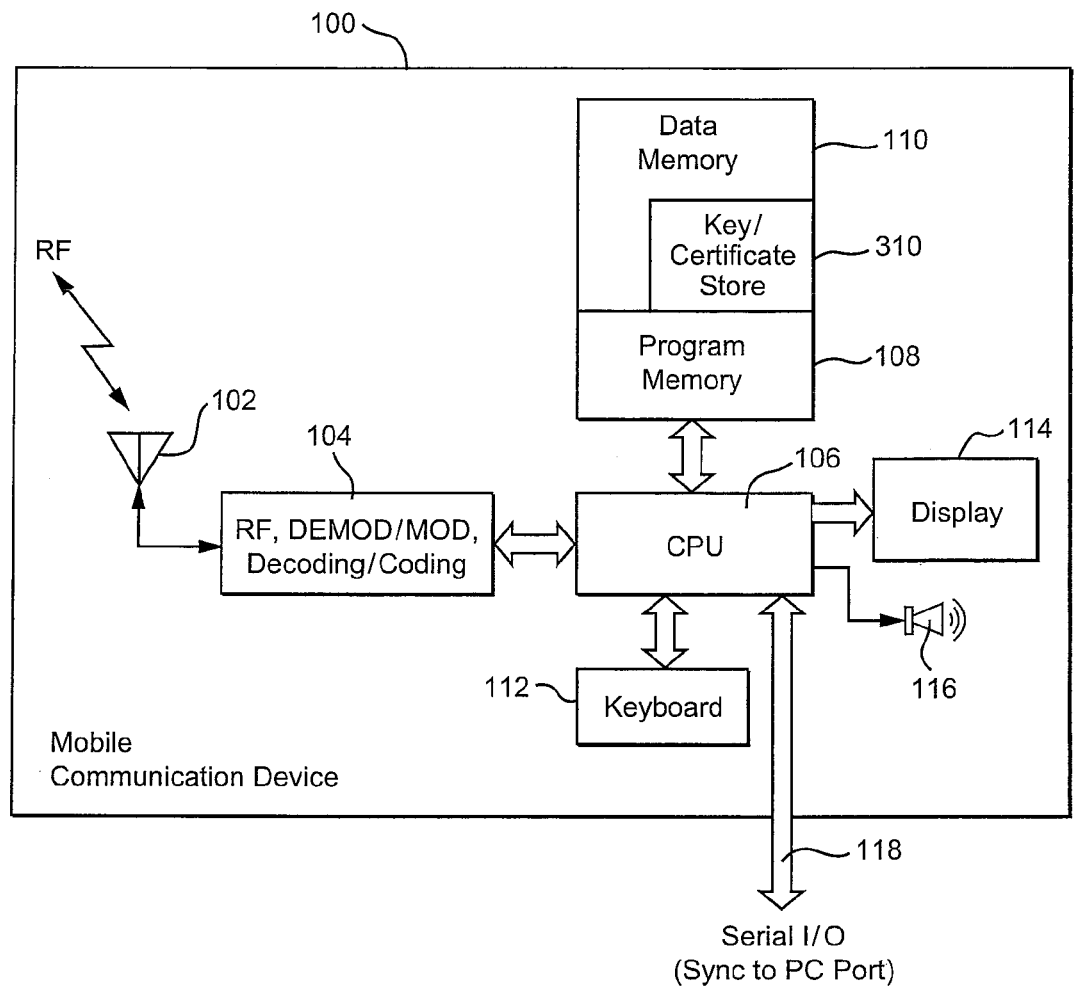
FIG. 3 is an illustrative schematic block diagram of an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. This portion 310 of the data memory 110 may also be use to store the certificates that are in devices that use the server. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign or Entrust, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 4:
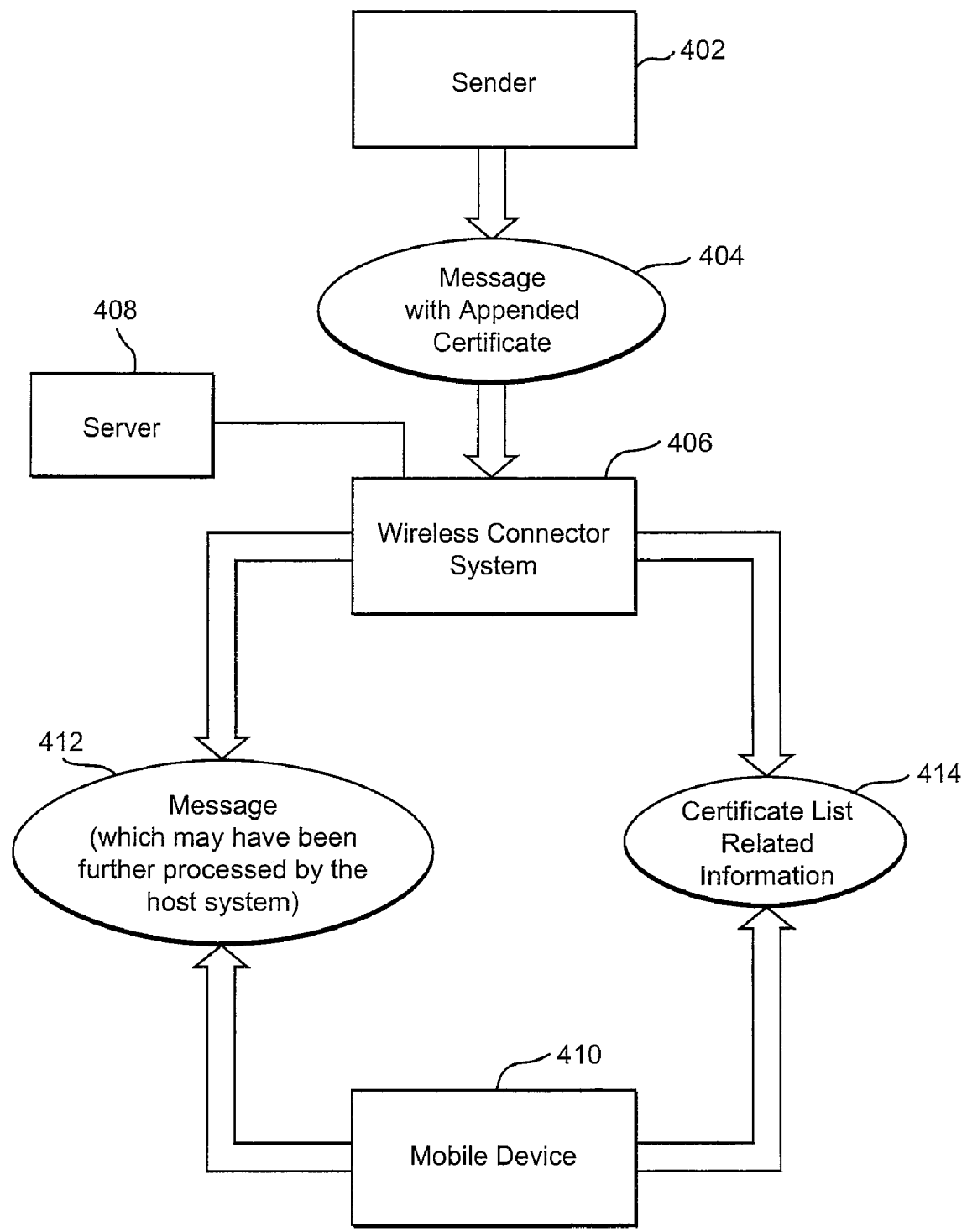
FIG. 4 is a block diagram depicting components used in handling messages.

FIG. 4 illustrates a situation where messages are provided to a mobile device 410 by a server 408 contained within a wireless connector system 406. With reference to FIG. 4, a message 404 from a sender 402 is provided to the wireless connector system 406. The server 408 within the wireless connector system 406 analyzes the encoded message 404 with respect to any appended certificates. If the certificate list for the mobile device 410 is determined to require updating or synchronization (as will be described in detail herein), then the server 408 may notify the mobile device 410 of certificate list related information 414. The server may process the message 412 before sending it to the mobile device such that the message 412 may be, for example, compressed by removing certificates that are contained in the destination mobile device 410. Moreover, data item 412 may be further processed by the server 408 such that the message is decoded and verified using the updated certificate information maintained by the server 408 and the result of such processing sent to the mobile device 410.

As an exemplary operational scenario, if the message is signed, and the server 408 knows the certificates that are contained in the mobile device 410, the server 408 in this situation may perform message verification and provide an indication to the mobile device 410 that verification has already been done by the server. The user receiving this message will then be aware that verification of the message has already been accomplished. In another operational example, the server may strip the message of certificate information known to be contained in the mobile device, thereby reducing the size of the message and providing significant bandwidth savings. Once again, an indication that certificate information has been stripped from the message may be provided to the mobile device.

Figure 5:
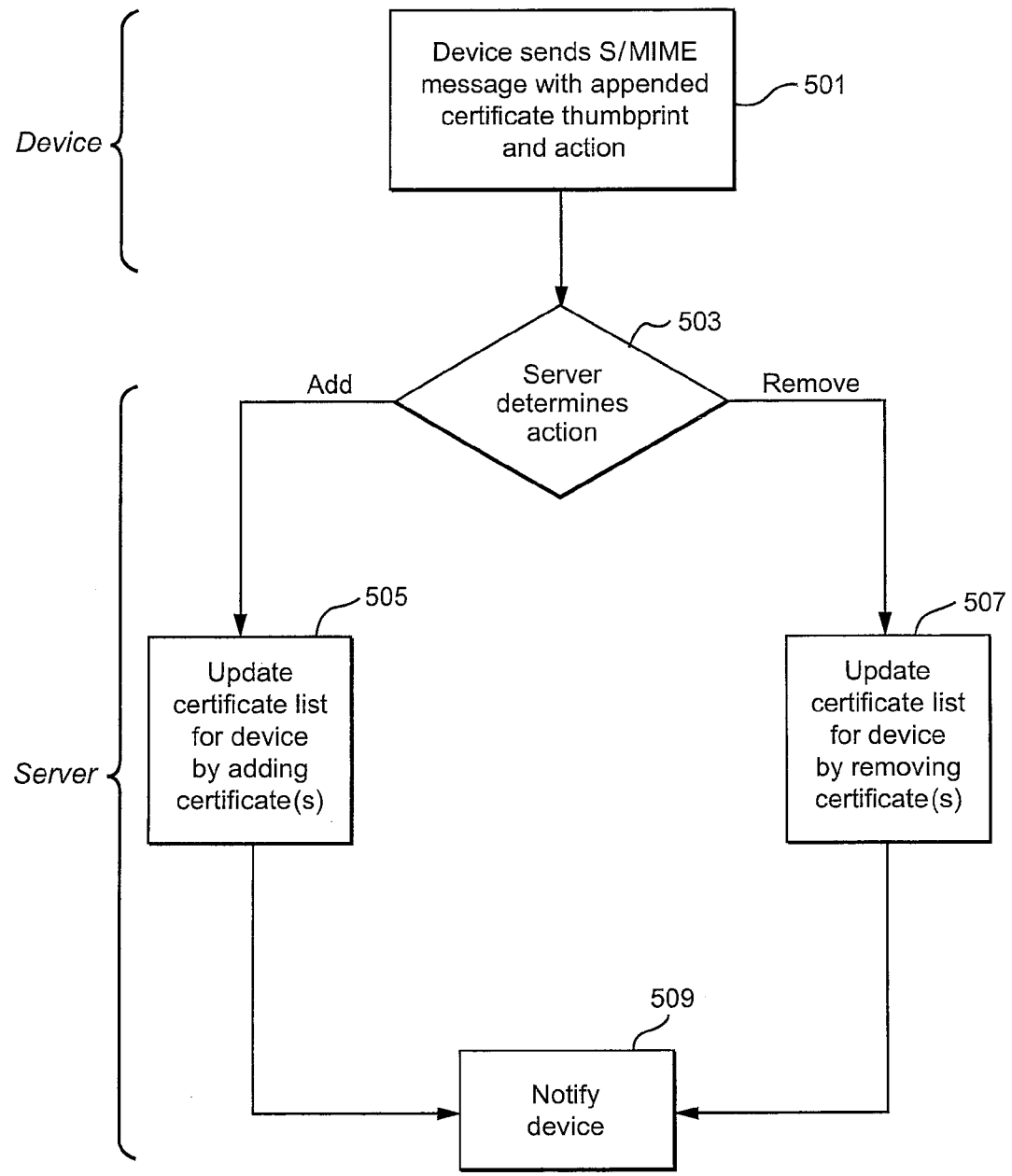
FIG. 5 is an illustrative flow diagram of an exemplary operational scenario for maintaining and synchronizing certificates between the server and device according to an exemplary embodiment of the invention.

According to an exemplary embodiment of the present invention, as illustrated in FIG. 5, the server is operable to synchronize certificates between the device and server. In particular, according to this example, the mobile device sends an S/MIME message to the server that includes at least one certificate thumbprint, together with an indication of an action to be taken by the server with respect to the appended certificate thumbprint. Of course, it will be understood that the S/MIME messages may be used to send one certificate thumbprint at a time, may send a thumbprint of all certificates on the device at once, or may send any intermediate number of certificate thumbprints, at the discretion of the user. For convenience, the description may refer to certificate thumbprints in the singular or plural, but it will be understood that any number may be processed. In addition to the certificate thumbprints, the S/MIME message includes an "action" or instruction for the server with respect to the appended certificate thumbprint. These actions are, for example, "add" or "remove."

Upon receipt of the S/MIME message from the device, the server determines which action is to be taken 503 based upon the action information contained in the received S/MIME message. If the action is to add a certificate to the list for a particular device, the server operates to update the certificate list associated with the device with the certificate or certificates appended to the message 505. Upon updating the certificate list, the server may, optionally, notify the device that the certificate list at the server has been updated 509. On the other hand, if the action is to remove a certificate from the list for a particular device, the server operates to update the certificate list associated with the device by removing or deleting the certificate or certificates appended to the message 507 from the certificate list associated with the device. Once again, upon updating the certificate list, the server may, optionally, notify the device that the certificate list at the server has been updated in accordance with the S/MIME message 509.

Another example is illustrated in FIG. 6. According to this operational example, the server may be operable to learn what certificates are on the mobile device by employing an empirical testing scheme. For example, when an S/MIME message is sent to the device 601, and is processed by the server 603, the server checks the sender's certificate 605. The server then determines whether it believes that the certificate appended to the sender's message is contained in the destination device 607. This may be done, for example, by comparing the certificate in the message with current list of certificate thumbprints for the destination device. Upon making a determination in step 607, the server then takes a particular action which, based on the determination made in step 607, will aid in synchronizing the certificates between the server and the device. For example, if the server determines that the certificate appended to the sender's message is in the destination device 607, the server operates to strip the certificate 609 from the sender's message, and to update the certificate list for the device 611 in the server memory. The server then sends a notification to the device of the action that has been taken 615. Alternatively, if, in step 607, the server determines that the certificate appended to the sender's message is not contained in the destination device, the server leaves the certificate appended to the message 613, and notifies the device of what action was performed by the server 615.

The device, upon receipt of the notification provided in step 615 then determines if the action taken by the server was correct 617. For example, if the server stripped a certificate from the sender's message, and the certificate was, indeed, present on the destination device, or that the server properly determined that the certificate appended to the sender's message was not present on the destination device and therefore did not strip the certificate, the device would send an acknowledgement to the server that the correct action had been taken 619. On the other hand, if the server improperly stripped the certificate from the sender's message, or left the certificate appended to the sender's message, when the device contained the certificate, the device would send the appropriate notification to the server 621, and remedial steps 623 could optionally be taken to correctly synchronize the certificates between the server and the device.

While the foregoing has been described in conjunction with specific exemplary embodiments, it is evident that many alternatives, modifications and variations will be apparent to those skilled in the art. Accordingly, the exemplary embodiments set forth herein are intended to be illustrative, not limiting. Various changes may be made without departing from the true spirit and full scope of the invention as defined in the appended claims.

The invention claimed is:

1. A method for synchronizing information between a server and a mobile device, the method comprising the mobile device:

receiving from said server a message and a notification of action taken by said server, said notification being an indication whether said server determined that a certificate appended to said message was contained on said device based upon a list maintained by said server;

said mobile device evaluating said notification to determine whether said action taken by said server was correct; and, when said mobile device determines that said action taken was correct, said mobile device sending an acknowledgement to said server that said action taken was correct, and when said mobile device determines that said action taken was incorrect, said mobile device sending a notification comprising a message to said server that said action taken was incorrect and directing said server to take remedial steps to correctly synchronize certificates stored on said mobile device with said list.

2. The method according to claim 1, wherein said notification instructs said server to either add or remove a certificate from said list.

3. The method according to claim 2, wherein when said mobile device determines that said server improperly determined that said certificate was not contained on said device, said notification comprises a message to said server to add said certificate to said list.

4. The method according to claim 1, wherein said message comprises an S/MIME message.

5. A system operative to synchronizing certificate information between a server and a mobile device, said system comprising:

said mobile device for receiving and processing messages and notifications of action taken by said server from said server;

program logic resident on said mobile device for determining whether said action taken by said server was correct by:

receiving said message and said notification from said server, said notification being an indication whether said server determined that a certificate appended to said message was contained on said device based upon a list maintained by said server;

evaluating said notification to determine whether said action taken by said server was correct; and, when said mobile device determines that said action taken was correct, sending an acknowledgement to said server that said action taken was correct, and when said mobile device determines that said action taken was incorrect, sending a notification comprising a message to said server that said action taken was incorrect and directing said server to take remedial steps to correctly synchronize certificates stored on said mobile device with said list.

6. The system according to claim 5, wherein said notification instructs said server to either add or remove a certificate from said list.

7. The system according to claim 6, wherein when said mobile device determines that said server improperly determined that said certificate was not contained on said device, said notification comprises a message to said server to add said certificate to said list.

8. The system according to claim 5, wherein said message comprises an S/MIME message.

* * * * *